(12) United States Patent
Wang et al.

(10) Patent No.: US 9,478,829 B2
(45) Date of Patent: Oct. 25, 2016

(54) RECHARGEABLE BATTERY WITH MULTIPLE RESISTANCE LEVELS

(71) Applicant: EC Power, LLC, State College, PA (US)

(72) Inventors: Chao-Yang Wang, State College, PA (US); Wei Zhao, Novi, MI (US)

(73) Assignee: EC Power, LLC, State College, PA (US)

( * ) Notice: Subject to any disclaimer, the term of this patent is extended or adjusted under 35 U.S.C. 154(b) by 194 days.

(21) Appl. No.: 14/189,517

(22) Filed: Feb. 25, 2014

(65) Prior Publication Data

US 2014/0342194 A1     Nov. 20, 2014

Related U.S. Application Data

(60) Provisional application No. 61/824,211, filed on May 16, 2013.

(51) Int. Cl.
| | |
|---|---|
| *H01M 10/42* | (2006.01) |
| *H01M 2/30* | (2006.01) |
| *H01M 10/48* | (2006.01) |
| *H01M 4/62* | (2006.01) |
| H01M 10/0525 | (2010.01) |
| H01M 10/30 | (2006.01) |
| H01M 10/44 | (2006.01) |

(52) U.S. Cl.
CPC .......... *H01M 10/4235* (2013.01); *H01M 2/30* (2013.01); *H01M 4/62* (2013.01); *H01M 10/486* (2013.01); *H01M 10/0525* (2013.01); *H01M 10/30* (2013.01); *H01M 10/443* (2013.01); *H01M 2200/10* (2013.01)

(58) Field of Classification Search
None
See application file for complete search history.

(56) References Cited

U.S. PATENT DOCUMENTS

| | | | |
|---|---|---|---|
| 6,072,301 A | 6/2000 | Ashtiani et al. | |
| 6,441,588 B1 | 8/2002 | Yagi et al. | |
| 8,334,675 B2 | 12/2012 | Wang et al. | |
| 2006/0275653 A1 | 12/2006 | Chang et al. | |
| 2008/0116851 A1* | 5/2008 | Mori | H01M 2/34 320/134 |
| 2009/0087723 A1 | 4/2009 | Inda | |
| 2010/0173179 A1 | 7/2010 | Matthias | |
| 2011/0143192 A1* | 6/2011 | Nakura | C01G 23/005 429/163 |
| 2011/0281154 A1* | 11/2011 | Vissers | H01G 9/0003 429/163 |
| 2012/0032642 A1 | 2/2012 | Xu et al. | |

(Continued)

FOREIGN PATENT DOCUMENTS

| | | |
|---|---|---|
| DE | 102012210146 A1 | 12/2013 |
| JP | 9-92335 A | 4/1997 |
| JP | 2002-369402 A | 12/2002 |

(Continued)

OTHER PUBLICATIONS

G. Nagasubramanian, "Electrican characteristics of 18650 Li—ion cells at low temperatures," Journal of Applied Electrochemistry, 31 (2001) 99-104, 2001.

(Continued)

*Primary Examiner* — Miriam Stagg
*Assistant Examiner* — Carmen Lyles-Irving
(74) *Attorney, Agent, or Firm* — McDermott Will & Emery LLP

(57) ABSTRACT

A rechargeable battery that features two or more levels of internal resistance according to various temperature ranges is disclosed.

17 Claims, 10 Drawing Sheets

(56) References Cited

U.S. PATENT DOCUMENTS

2012/0288747 A1* 11/2012 Naoi .................. H01G 11/12
　　　　　　　　　　　　　　　　　　　　429/178
2013/0288089 A1　10/2013　Kinoshita et al.

FOREIGN PATENT DOCUMENTS

| | | |
|---|---|---|
| JP | 2009-118729 A | 5/2009 |
| JP | 2010-205710 A | 9/2010 |
| JP | 2012-069280 A | 4/2012 |
| JP | 2012-69280 A | 4/2014 |
| JP | 2012-69496 A | 4/2014 |
| WO | 2013/186079 A1 | 12/2013 |

OTHER PUBLICATIONS

S.S. Zhang et al., "Electrochemical impedance study on the low temperature of Li—ion batteries," Electrochimica Acta, 49 (2004) 1057-1061.

H.P. Lin et al., "Low-Temperature Behavior of Li—Ion Cells," Electrochemical Solid-State Letters, 4 (6) A71-A73 (2001).

J. Fan et al., "Studies on Charging Lithium—Ion Cells at Low Temperatures," Journal of the Electrochemical Society, 153 (6) A1081-A1092 (2006).

C.K. Huang et al., "The Limits of Low-Temperature Performance of Li—Ion Cells," Journal of the Electrochemical Society, 147 (8) 2893-2896 (2000).

S.S. Zhang et al., "The low temperature performance of Li—ion batteries," Journal of Power Sources, 115 (2003) 137-140.

M.C. Smart et al., "Electrolytes for Low-Temperature Lithium Batteries Based on Ternary Mixtures of Aliphatic Carbonates," Journal of the Electrochemical Society, 146 (2) 486-492 (1999).

M.C. Smart et al., "Use of Organic Esters as Cosolvents in Electrolytes for Lithium—Ion Batteries with Improved Low Temperature Performance," Journal of The Electrochemical Society, 149 (4) A361-A370 (2002).

S.S. Zhang et al., "Low temperature performance of graphite electrode in Li—ion cells," Electrochimica Acta, 48 (2002) 241-246.

M. D. Zolot et al., "Thermal Evaluation of The Honda Insight Battery Pack," in: 36th Intersociety Energy Conversion Engineering Conference, Savannah, GA, 2001, pp. 923.

A. Pesaran et al., "Cooling and Preheating of Batteries in Hybrid Electric Vehicles," The 6th ASME-JSME Thermal Engineering Joint Conference, Hawaii Island, Hawaii, 2003.

S.S. Zhang et al., "Charge and discharge characteristics of a commerical LiCoO2-based 18650 Li—ion battery," Journal of Power Sources, 160 (2006) 1403-1409.

Y. Ji, et al., "Li—ion cell operation at low temperatures," J. Electrochemical Society, (2013) 160 (4) A636-649.

International Search Report issued in International Application No. PCT/US2014/037209 dated Sep. 2, 2014.

Ji, Y. et al., "Heating strategies for Li—ion batteries operated from subzero temperatures", Electrochimica Acta (2013) 107:664-674.

International Search Report and Written Opinion issued in International Patent Application No. PCT/US2014/059729, mailed on Jun. 29, 2015; 12 pages.

International Search Report and Written Opinion issued in International Patent Application No. PCT/US2014/059726, mailed on Jun. 26, 2015; 13 pages.

International Preliminary Report on Patentability and Written Opinion issued in International Application No. PCT/JS2014/037209 dated Nov. 17, 2015.

Non-final Office Action issued in U.S. Appl. No. 14/267,648 dated Feb. 9, 2016, 19 pages.

Copending U.S. Appl. No. 14/255,780.

* cited by examiner

RECHARGEABLE BATTERY WITH MULTIPLE RESISTANCE LEVELS

CROSS-REFERENCE TO RELATED APPLICATION

This application claims the benefit of U.S. Provisional Application No. 61/824,211 filed May 16, 2013 the entire disclosure of which is hereby incorporated by reference herein.

TECHNICAL FIELD

The present invention relates generally to rechargeable batteries, and more particularly, to a rechargeable battery configured with more than one internal resistance levels. Such batteries include lithium-ion batteries with more than one internal resistance levels.

BACKGROUND

Rechargeable batteries for electronics, transportation and grid energy storage commonly suffer from low performance and safety concerns at extreme temperatures. At low temperatures, especially subfreezing temperatures, rechargeable batteries, especially lithium-ion batteries, exhibit very low power performance and low energy due to sluggish electrochemical kinetics and transport processes occurring in the battery cell. At high temperatures, lithium-ion batteries become safety hazards. There is a strong need for robust and safe use of these batteries in transportation and grid energy storage at all potential operating temperatures.

It is further desirable to promote rapid internal heating within battery cells at low ambient temperatures so that the electrochemical and transport processes controlling the battery performance can be greatly improved with rapid internal temperature rise. It is also desirable to be able to detect noticeable changes in voltage or current when a battery begins to operate beyond normal temperatures, well before the battery becomes a safety hazard such as when the battery enters into thermal runaway. Both needs can be addressed by devising a battery with two levels of internal resistance, termed as the dual resistance battery herein.

SUMMARY OF THE DISCLOSURE

An advantage of the present disclosure is a rechargeable battery, such as a lithium ion battery, that has more than one internal resistance level. Advantageously, such batteries can be operated at one internal resistance level over one temperature range and at other resistance levels at other temperatures or temperature ranges. The difference between various resistance levels can be a factor of two to fifty or higher. Switching between different resistance levels can improve the performance and safety of rechargeable batteries.

These and other advantages are satisfied, at least in part, by a rechargeable battery comprising one level of internal resistance ($R_1$) over a temperature range of the battery between a first temperature ($T_1$) and a second temperature ($T_2$), and a second level of internal resistance ($R_2$) outside of either $T_1$ or $T_2$, wherein the value of $R_2$ at about 2° C. below $T_1$ is at least twice the value of $R_1$ at $T_1$ or the value of $R_2$ at about 2° C. above $T_2$ is at least twice the value of $R_1$ at $T_2$. The rechargeable battery can have additional resistance levels, e.g., a third resistance level ($R_3$) associated with a third temperature range ($T_3$, $T_4$), and so forth. Advantageously, the value of $R_2$ at about 2° C. below $T_1$ is at least twice to fifty times the value of $R_1$ at $T_1$ and the value of $R_2$ at about 2° C. above $T_2$ is at least twice to fifty times the value of $R_1$ at $T_2$.

Embodiments of the disclosure include a rechargeable battery having two resistance levels, e.g., a dual resistance level battery, having at least two terminals for operating the battery at $R_1$ and at least two terminals for operating the battery at $R_2$. The dual resistance battery can further include a switch driven by a temperature sensor or a controller for switching between the terminals for operating the battery at $R_1$ and the terminals for operating the battery at $R_2$.

Additional embodiments of the disclosure include a rechargeable battery including a thermally sensitive material added to one or more electrode binders of a cell of the battery that allow for electrode conductivity modulated with temperature and/or one or more thermally sensitive additives in an electrolyte that changes a viscosity and/or an ionic conductivity of the electrolyte as a function of temperature. Such features can act to change the internal resistance levels of the rechargeable battery as a function of temperature.

Another aspect of the present disclosure is a method of operating a rechargeable battery having multiple internal resistance levels. The method comprising operating the rechargeable battery at a first internal resistance level over a certain temperature range, e.g., over a temperature range defined as $T_1$ and $T_2$, and operating the battery at a second internal resistance level at or over other temperature ranges, e.g., at $R_2$ when the battery is outside $T_1$ and/or $T_2$.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIG. 7A shows the internal resistance characteristics of a prototype 40 Ah dual-resistance battery as a function of battery temperature. FIG. 7B shows the internal resistance characteristics of a conventional 40 Ah battery. FIG. 7C is a chart showing the change in resistance over the change in temperature (dR/dT) for the resistance levels and temperatures associated with FIG. 7A and FIG. 7B.

DETAILED DESCRIPTION OF THE DISCLOSURE

Figure 1:
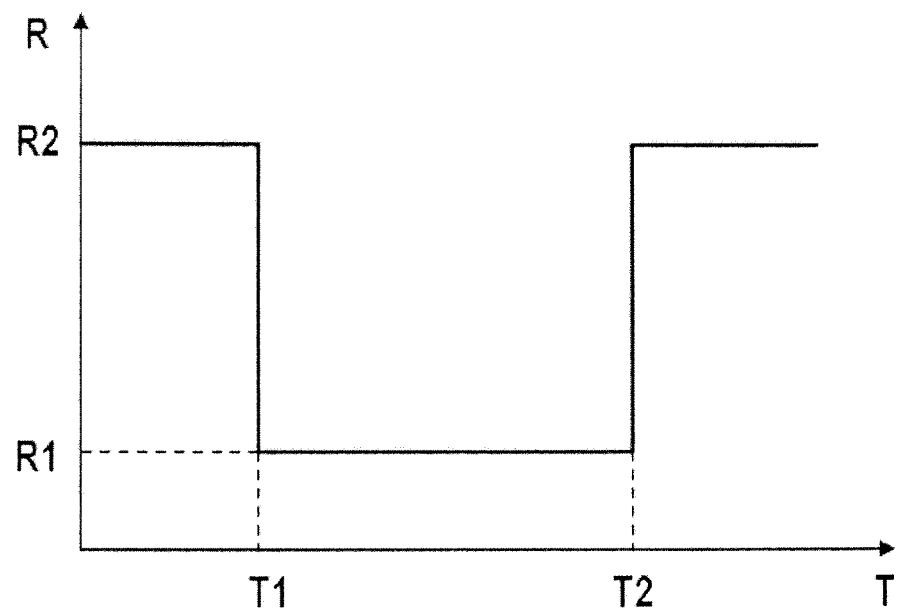
FIG. 1 is a schematic showing resistance as a function of temperature in an idealized rechargeable battery according to an embodiment of the present disclosure.

The present disclosure relates to a rechargeable battery that has two or more internal resistance levels. As used herein the term battery is used to represent any rechargeable electrochemical energy storage device that contains one or more electrochemical cells. The battery configuration of the present disclosure can be applied to a variety of batteries such as, but not limited to, lithium-ion, lithium-polymer, nickel-metal hydride, nickel-manganese-cobalt, lithium-sulfur and lithium-air batteries. Such batteries are useful for transportation, aerospace, military, and stationary energy storage applications. An advantage of the rechargeable battery of the present disclosure is that the internal resistance of the battery can change in a stepwise manner depending on the temperature of the battery.

For example, during normal operating conditions, such as during normal or optimum operating temperatures, the internal resistance of a rechargeable battery according to an embodiment of the present disclosure can be low, e.g., as low as in conventional batteries. But when the battery experiences temperatures outside of this normal or optimum range, the battery can be made to operate at a different, e.g., higher, resistance level. In one aspect of the present disclosure, a rechargeable battery can have multiple internal resistance levels that change depending on a particular temperature or temperature range. That is, a rechargeable battery of the present disclosure can have a first resistance level ($R_1$) associated with a first temperature range ($T_1$, $T_2$), a second resistance level ($R_2$) associated with a second temperature range ($T_3$, $T_4$), a third resistance level ($R_3$) associated with a third temperature range ($T_5$, $T_6$), and so forth. The resistance levels associated with any particular temperature range preferably changes abruptly such as a change associated with a step or square function. That is, there is a relatively abrupt change in the resistance level between and among temperature ranges.

In an embodiment of the present disclosure, a rechargeable battery can have at least two levels of internal resistance (dual resistance battery) depending on the battery's temperature. As used herein the temperature of the battery can be the internal temperature or external surface temperature. The dual resistance battery of the present embodiment can be configured to operate at a higher resistance level when the internal temperature of the battery is below an optimum temperature thereby heating the battery and improving battery performance. For example, when the battery's internal temperature is below a normal range, e.g. below normal operating temperatures such as below about 5° C. or in subfreezing environments (temperatures less than about 0° C., e.g., less than about −10 or −20° C.), the internal resistance of the dual resistance battery becomes severalfold higher than when the battery operates in the normal temperature range (e.g. in the range of from about 40 $\Omega cm^2$ to about 200 $\Omega cm^2$). As a result, there is much intensified internal heating (as the battery's heat generation is proportional to its internal resistance), which leads to rapid rise of the battery's internal temperature. This in turn quickly improves power and energy output of the battery while operating in subfreezing environments.

Such a dual resistance battery can also be configured to switch to a high internal resistance once the battery's internal temperature exceeds the high end of the normal operating range (e.g., above about 45° C., such as above about 50° C., 60° C. and 70° C.). Such higher internal temperatures can occur during abuse or a faulty event. The high internal resistance causes much enlarged cell voltage overshoot in the cell overcharge case, thus greatly facilitating early detection and shutdown of external charging systems before the cell enters a thermal runaway condition. In a short circuit case, for example, the higher internal resistance will release battery energy at a slower and controlled rate, thereby slowing down the rate of the cell temperature rise and protecting the cell from thermal runaway. This high internal resistance feature at the high end of the normal temperature range ensures inherent safety of the battery.

In an embodiment of the present disclosure, a rechargeable battery that exhibits at least two levels of internal resistance depending on the battery's temperature is described. The rechargeable battery can comprise one level of internal resistance ($R_1$) over a temperature range of the battery between a first temperature ($T_1$) and a second temperature ($T_2$), and a second level of internal resistance ($R_2$) outside of either $T_1$ or $T_2$. Preferably the value of $R_2$ changes abruptly below $T_1$ and/or at above $T_2$, e.g., the value of $R_2$ at about 2° C. below $T_1$ is at least twice the value of $R_1$ at $T_1$ or the value of $R_2$ at about 2° C. above $T_2$ is at least twice the value of $R_1$ at $T_2$. In one aspect of the present disclosure, the value of $R_2$ at about 2° C. below $T_1$ and/or at about 2° C. above $T_2$ is at least five times, e.g., at least 10, 15, 20, 30 or as high as 50 times the value of $R_1$ at $T_1$ or the value of $R_1$ at $T_2$. In another aspect of the disclosure the value of $R_2$ changes abruptly both below $T_1$ and above $T_2$.

An example of an idealized resistance to temperature relationship of such a rechargeable battery having two resistance levels is schematically illustrated in FIG. 1. As shown in FIG. 1, during a normal operating temperature range, e.g., $T_1 < T < T_2$, where $T_1$ is about 0° C. and $T_2$ is about 50° C., for example, the battery exhibits a low internal resistance ($R_1$) similar to the internal resistance experienced in a conventional rechargeable battery, e.g., such as a Li-ion battery. However, outside this operating temperature range, the internal resistance of the battery jumps to a higher level ($R_2$) where $R_2$ is preferably 2-50 times that of $R_1$ when the value for $R_2$ is determined within about 2° C. of $T_1$ and/or $T_2$.

A rechargeable battery having more than one internal resistance levels can be implemented in lithium ion batteries. Configuring a rechargeable lithium ion battery to have more than one internal resistance levels advantageously allows such a battery to operate safely and robustly in abnormally cold or hot environments without the need for complex and expensive battery management systems. In such a lithium ion battery, the battery can be configured to have a jump in its internal resistance at low temperatures, e.g., outside an optimal temperature range. When such a jump in resistance occurs, internal heat generated by the battery is intensified, which in turn leads to rapid internal warm-up and hence much improved power and energy performance of the battery. A battery's internal heat generation is proportional to its internal resistance. Thus a 2-50 fold increase in resistance of a rechargeable lithium ion battery can have a proportional increase in heat generation at a temperature below an optimal temperature to operate the battery.

In addition, the rechargeable battery can be operated at a higher internal resistance level at hot temperatures as well which improves the safety of the battery. For instance, during an abusive event, e.g., an overcharge or overdischarge event, the dual resistance battery can be switched into the high internal-resistance level once the battery temperature exceeds $T_2$, substantially amplifying the voltage overshoot or undershoot, respectively. This gives an external electronic control unit based on voltage limits, e.g. battery controller, an ample opportunity to shut down the battery operation before further temperature rise and catastrophic thermal runaway can ensue.

In an embodiment of the present disclosure, a rechargeable battery having more than one internal resistance levels can be included in a battery system. The battery system can further include a controller that can switch between operating the battery at various resistance levels, e.g., between operating the battery at one resistance level (e.g., $R_1$) at a certain temperature or over a temperature range and operating the battery at another resistance level (e.g., $R_2$) at other temperatures of range of temperatures. The battery system can also include a temperature sensor for determining the internal temperature of the battery or one or more cells of the battery, e.g., temperature ranges $(T_1, T_2)$, $(T_3, T_4)$, $(T_5, T_6)$, and so forth. The temperature sensor can be a thermocouple or a thermistor mounted inside a cell or on the cell's outer surface of the battery to detect the temperature of the cell.

In operation the controller allows the battery to operate at one resistance level within one temperature range and at a second resistance level at another temperature range or at above or below a certain temperature, and so forth. That is, a rechargeable battery having one level of internal resistance ($R_1$) over a temperature range of the battery between a first temperature ($T_1$) and a second temperature ($T_2$), and a second level of internal resistance ($R_2$) outside of either $T_1$ or $T_2$, can be operated at $R_1$ over $T_1$ and $T_2$, and operated at $R_2$ when the battery is outside $T_1$ or $T_2$.

A multi-resistant rechargeable battery of the present disclosure can be fabricated by several methods, including but not limited to: (a) arranging cell architectures within the battery that are thermally activated, (b) constructing the battery with a thermally sensitive material added to one or more electrode binders of the cell that allow for electrode conductivity modulated with temperature, and/or (c) constructing the battery with one or more thermally sensitive additives in an electrolyte of the cell that changes the viscosity and/or ionic conductivity of the electrolyte as a function of temperature. The multi-resistant rechargeable battery of the present disclosure can be in any conventional form, such as in a pouch, a cylindrical, a prismatic, or an angular form, and can be fabricated with any conventional rechargeable active cathode and anode materials such as those used for Li-ion, nickel-metal hydride, nickel-manganese-cobalt, etc. For example, positive-electrode active materials can include lithium cobalt oxide, lithium iron phosphate, lithium manganese oxide, lithium nickel-cobalt-manganese oxides, lithium-rich layered oxides, or their mixtures. Negative-electrode active materials can include, for example, graphite, silicon, silicon alloys, a metal alloy, lithium metal, lithium alloys such as lithium titanate, etc. The rechargeable battery of the present disclosure can further include an electrolyte in the form of a liquid, polymer-gel, or solid.

Figure 2:
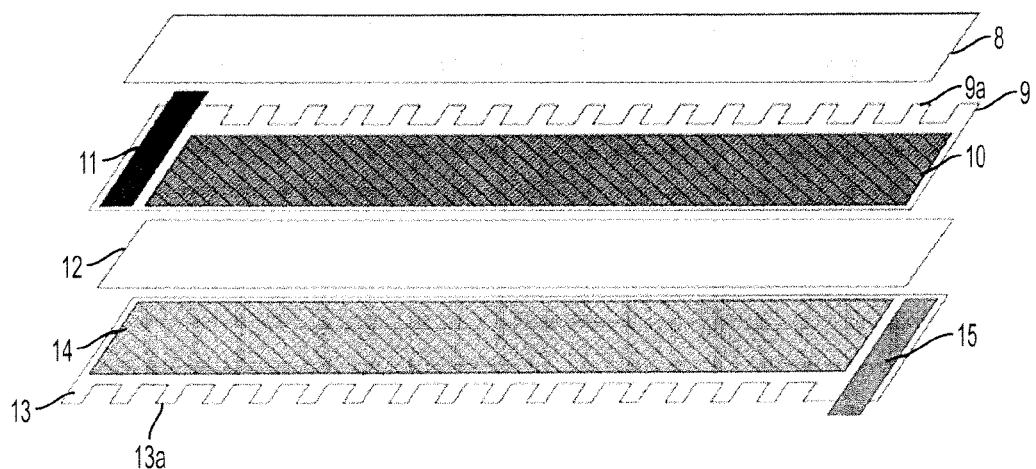
FIG. 2 illustrates a dual-resistance cell construction composed of two electrode sheets sandwiching a separator according to the embodiment of the present disclosure.
Figure 3A:
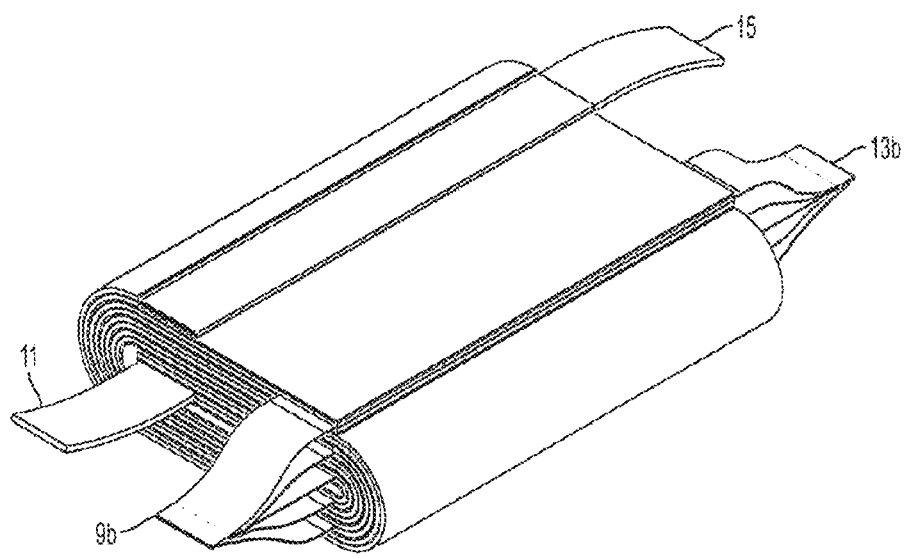
FIG. 3A shows a perspective view of a wound dual-resistance battery according to the embodiment of the present disclosure.

In an embodiment of the present disclosure, a rechargeable battery includes a cell architecture with at least two resistance levels. For example, FIG. 2 illustrates a battery cell design, which comprises negative electrode sheet (9, 10) having anode material (e.g., graphite) 10 coated onto a metal (e.g., copper) foil 9, positive electrode sheet (13, 14) having cathode material 14 coated onto a metal (e.g., aluminum) foil 13, and separators 12 and 8 in therebetween. This cell architecture is applicable to rechargeable batteries such as Li-ion, nickel-metal hydride, etc. The corrugated shapes on foils 9 and 13 represent current-collecting tabs (9a and 13a, respectively) machined out of these foils. When these sheets are rolled up to form either a cylindrical or a flat jelly roll as shown in FIG. 3A, these small tabs on the negative and positive sheets are lined up and welded together to form a negative terminal 9b and a positive terminal 13b for the battery, which can be employed with any conventional rechargeable battery. In addition to terminals 9b and 13b, the multi-resistant rechargeable battery of the present embodiment further includes strip tab 11 onto negative metal foil 9, and another strip tab 15 onto positive metal foil 13. These strip tabs can be welded onto foils 9 and 13, respectively. After winding into a jelly roll, these two strip tabs give rise to two new terminals as shown in FIG. 3A: one for the negative, and the other for the positive. The cross-section of the flat jelly roll and the locations of the two strip tabs are further illustrated in FIG. 3B. This figure also shows that foils 9 and 13 are coated on both major surfaces with active materials.

Figure 3B:
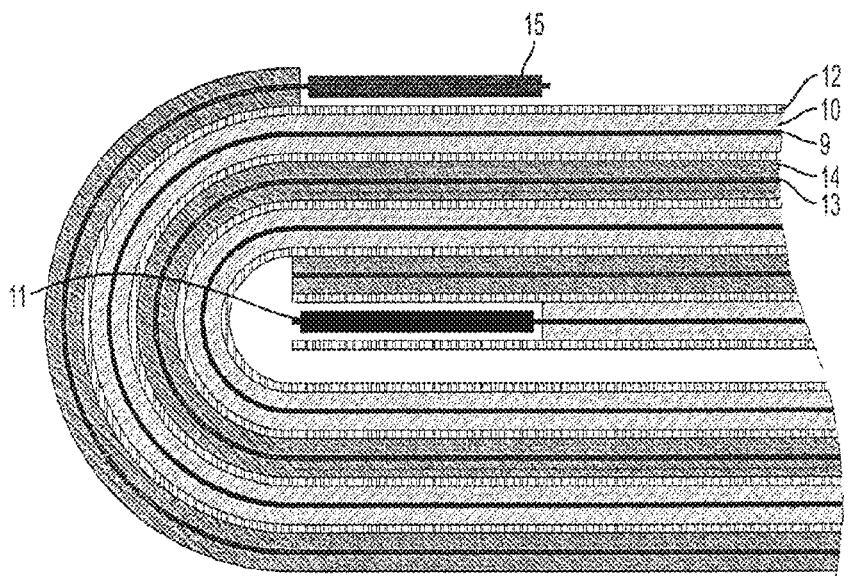
FIG. 3B shows a cross-sectional view of a wound dual-resistance battery according to the embodiment of the present disclosure.
Figure 4:
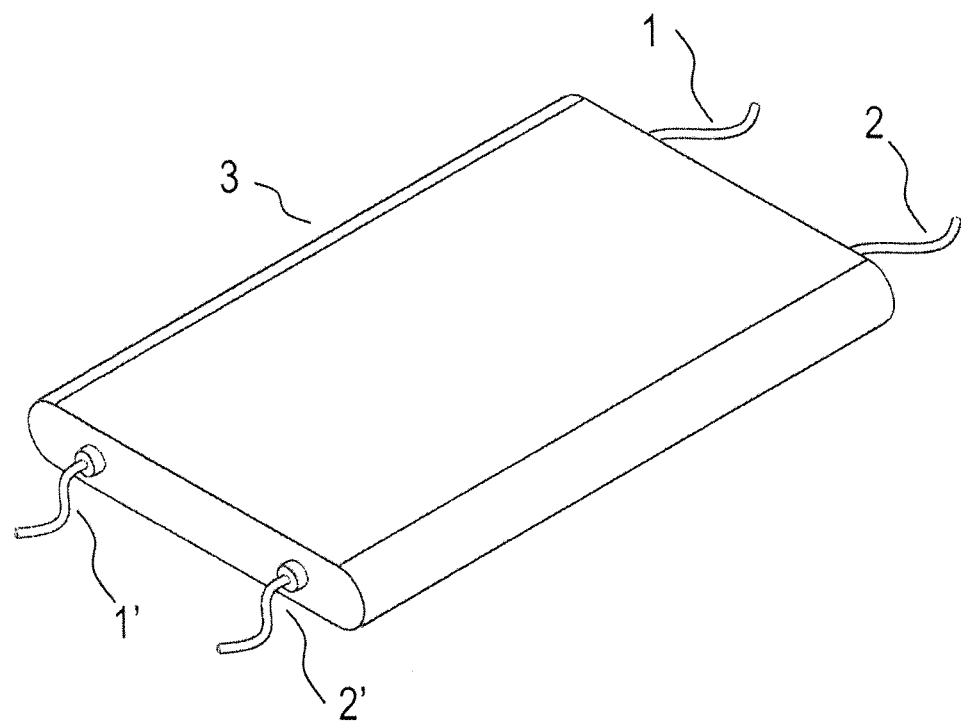
FIG. 4 illustrates an assembled dual-resistance battery with two pairs of terminals, where one pair of terminals are for low internal resistance and the other pair of terminals are for high resistance according to the embodiment of the present disclosure.

A dual resistance battery can be fabricated by inserting the jelly roll as shown in FIGS. 2-3B in a prismatic case and filled with an electrolyte, for example. Such a battery is shown in FIG. 4 where there are two pairs of negative and positive terminals. The pair 2 and 2' result from the multiple tabs welded together gives a low internal resistance as in a conventional battery (e.g., 9a and 13a), while terminals 1 and 1' originate from the two strip tabs displayed as 11 and 15 in FIG. 2 and provide operating the battery at a second, high internal resistance.

Figure 5A:
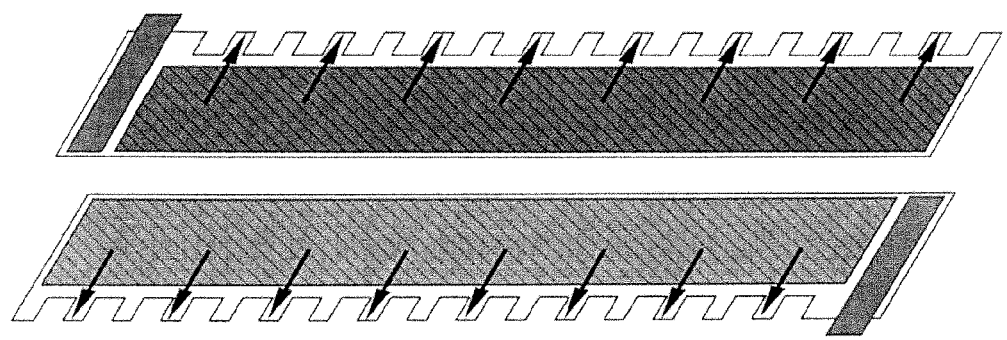
FIG. 5A illustrates the current flow in the dual-resistance battery operated at low-resistance level according to the embodiment of the present disclosure.
Figure 5B:
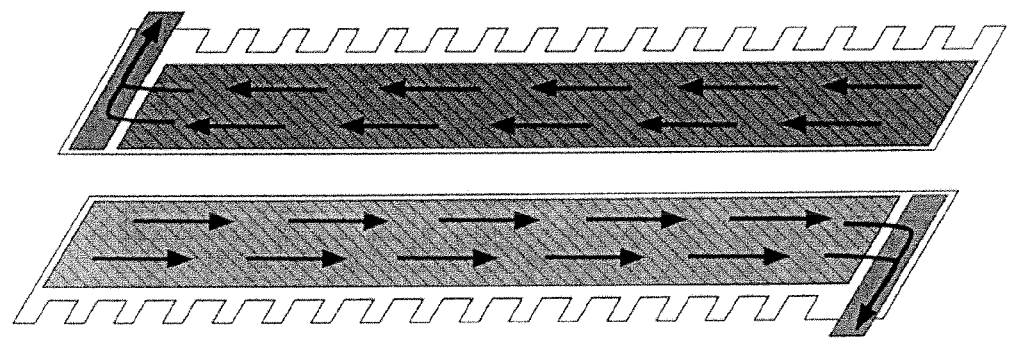
FIG. 5B illustrates the current flow in the dual-resistance battery operated at high-resistance level according to the embodiment of the present disclosure.

FIGS. 5A and 5B illustrate how the resistance level changes in the dual resistance battery fabricated by the examples of FIGS. 2-4. As shown by the arrows in FIG. 5A, the internal resistance of the battery can be small as the current generated from battery active materials travels a very short distance to its nearest small tab and subsequently to the terminals 2 and 2'. On the other hand, if the terminal pair 1 and 1' are used, the battery's internal resistance abruptly increases due to the current flow following the much longer pathways shown by arrows in FIG. 5B. When a thermally sensitive switch such as thermostat or bimetal switch is used to switch between the low-resistance terminal pair (2,2') to the high-resistance terminal pair (1,1') according to the cell temperature, a dual resistance battery is created, having essentially the characteristics illustrated in FIG. 1.

Figure 6:
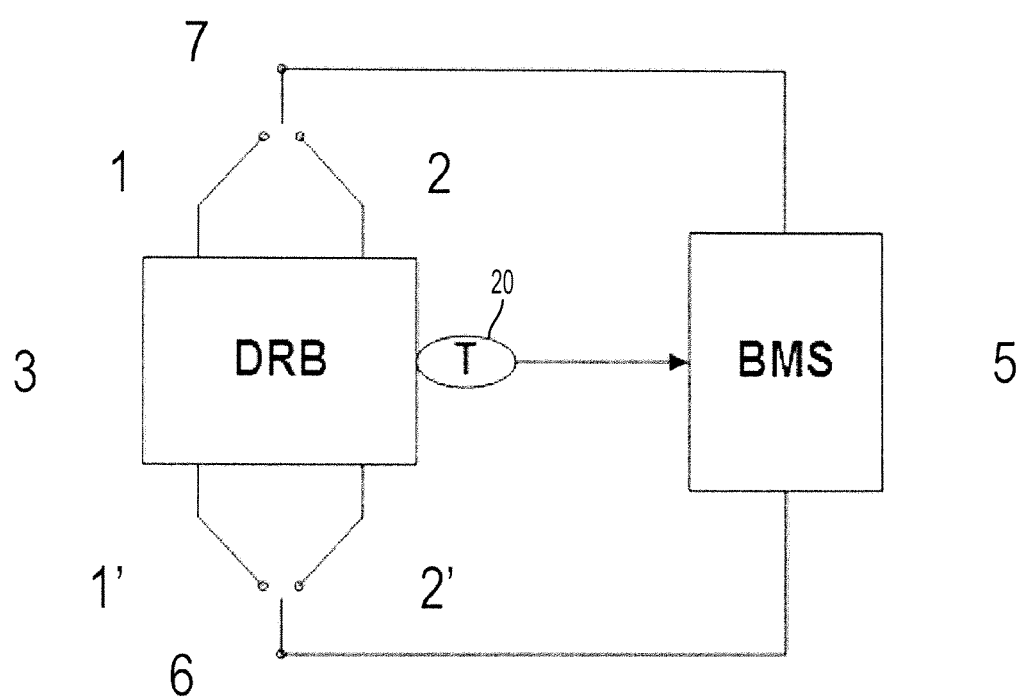
FIG. 6 is a diagram showing a battery management system configured to control a dual-resistance battery according to the embodiment of the present disclosure.

Alternatively, the switch from low-resistance terminals (2,2') to high-resistance terminals (1,1') and vice versa can be carried out by a controller having an electric circuit and a cell temperature sensor in a battery management system. For example and as shown in FIG. 6, a battery system includes a multi resistant rechargeable battery, e.g., the dual resistance battery as shown by FIGS. 2-5B (3) controller (5), which is in electrical communication with temperature sensor 20 and electrical contacts (6) and (7). During battery usage, the temperature sensor (20) will detect the battery temperature and send it to controller (5). If the battery temperature is within the temperature range ($T_1$, $T_2$), controller (5) will direct switches (6) and (7) to connect with the battery's terminals (2,2'), giving rise to a low internal resistance of the battery. On the other hand, if the detected temperature is outside the range ($T_1$,$T_2$), controller (5) will direct switches (6) and (7) to connect with terminals (1,1'), thus yielding the high internal resistance.

Advantageously, the dual resistance battery can be implemented for all battery chemistries, such as rechargeable lithium ion, nickel-metal hydride, or advanced lithium batteries such as lithium-sulfur or lithium-air batteries, and for all form factors, either pouch, cylindrical, prismatic or angular. The cell architecture described above for FIGS. 2-5B can be used to fabricate a dual resistance rechargeable battery with a one level of internal resistance ($R_1$) for one set of terminals and a second level of internal resistance ($R_2$) for a second set of terminals. The cell structure can accommodate rolled electrode and stacked electrode designs, among others. By extension, a battery with more than 2 levels of internal resistance can also be constructed according to the present disclosure.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Figure 7A:
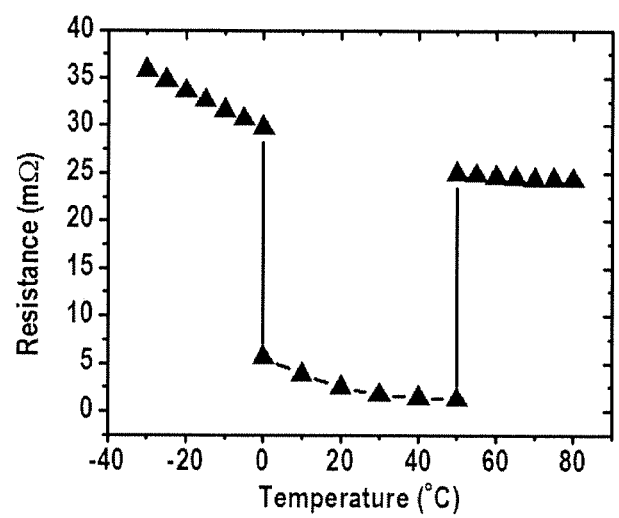
FIGS. 7A-7C show a series of graphs to further illustrate the performance of a multi-level resistance battery according to an embodiment of the present disclosure.

A laboratory-scale dual resistance battery of 40 Ah, in the form of a pouch cell and made of lithium-nickel-manganese-cobalt (NMC) cathode and graphite anode, was developed. The internal resistance of this battery is shown in FIG. 7A, where the resistance switch is designed to occur at about 0° C. and about 50° C., respectively. During testing of the 40 Ah dual resistance battery, a thermocouple is mounted onto the outer surface of the battery and connected to a voltmeter to read the battery temperature. The switch between the low and high resistance terminals is done manually according to the battery temperature reading. If it is outside the temperature range of 0° C. and 50° C., the external electronic load is connected to the high-resistance terminals (1, 1'). If it is within the temperature range, the external load is manually connected to the low-resistance terminals (2, 2'). Alternatively, an automatic switch based on the thermocouple reading can be devised to switch between terminals (2, 2') and (1, 1').

It is clearly seen from FIG. 7A that in the optimal range for operating this Li-ion battery, the internal resistance is as low as in a state-of-the-art Li-ion cell (e.g., between about 1 mΩ and 6 mΩ). However, the resistance jumps by a factor of 5 (from 6 mΩ to 30 mΩ) once the cell temperature drops below the freezing point, and by a factor of 20 (from 1.25 mΩ to 25 mΩ) when the cell temperature rises above 50° C. When the cell is discharged at ambient temperature below freezing, the high cell internal resistance enables rapid cell heating (heat generation rate of $I^2R$ where R is cell resistance) eliminating the need of a commonly-used battery pack convective heating process that consumes substantial battery energy, thereby drastically reducing the drive range.

Figure 7B:
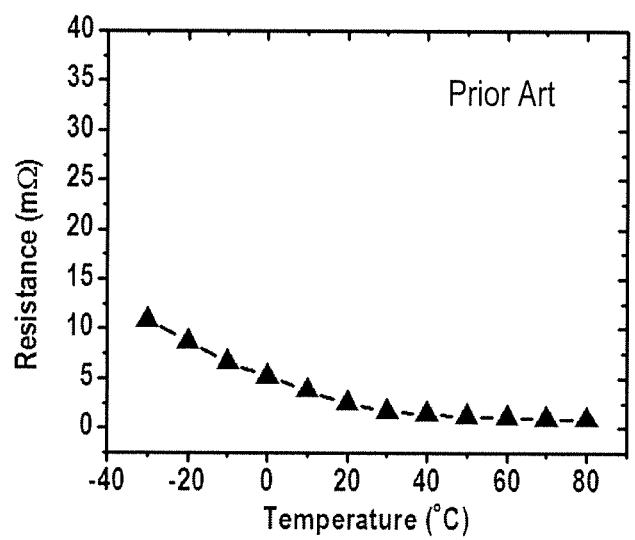
Figure 7C:
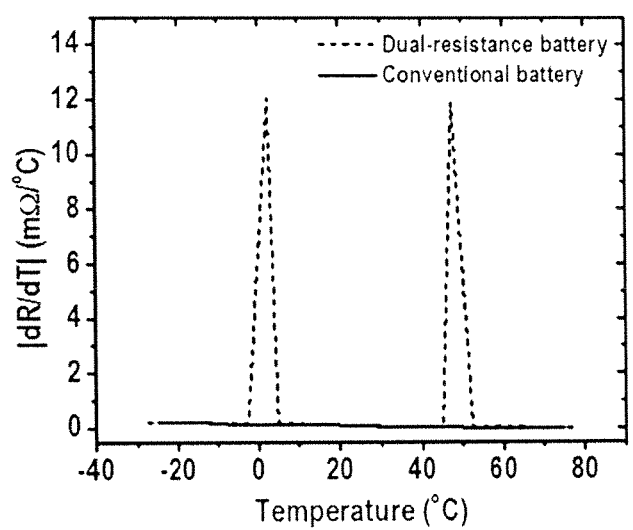

In a comparative example, another 40 Ah battery was developed and assembled in the same way as the dual resistance rechargeable battery described above except that there are no strip tabs (11) and (15) on current collectors and hence no high-resistance terminals (1, 1'). This comparative example battery has only one internal resistance level, e.g., the typical resistance level associated with a rechargeable battery. The battery having a single resistance level will be termed a conventional battery in the following discussions. This battery's internal resistance is shown in FIG. 7B. As shown in FIG. 7B, the internal resistance of the conventional battery changes more or less continuously over temperature. There are no abrupt changes in the resistance level as a function of temperature as, for example, as shown in FIG. 7A. FIG. 7C further shows the difference between the resistance of a rechargeable battery of the present disclosure to a conventional battery. FIG. 7C shows the change in resistance over the change in temperature (dR/dT) for the resistance levels and temperatures associated with FIG. 7A and FIG. 7B.

Figure 8A:
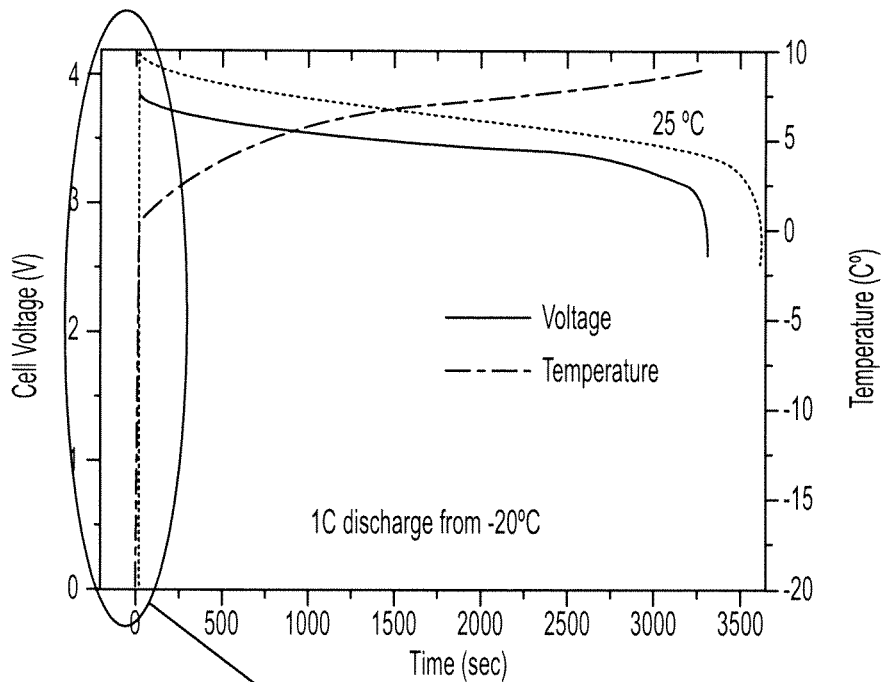
FIGS. 8A and 8B show the voltage and temperature curves of the 40 Ah dual-resistance battery of FIG. 7A discharged at 1 C rate from −20° C. ambient according to the embodiment of the present disclosure.
Figure 8B:
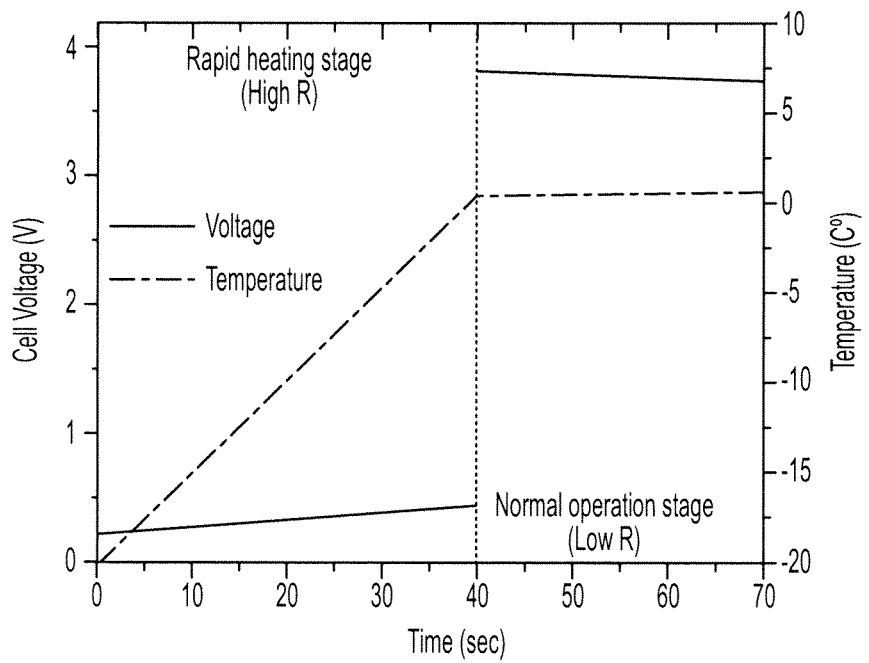
Figure 9:
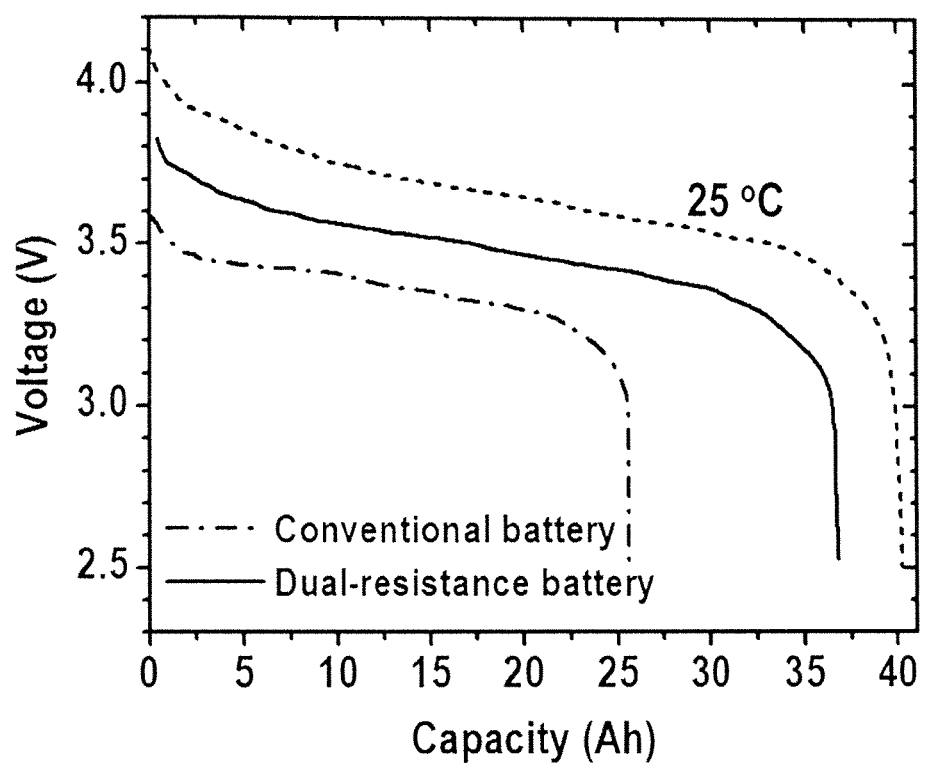
FIG. 9 is a graph that compares discharge curves of a conventional and a dual-resistance battery discharged at 1 C rate from −20° C. ambient along with a reference performance curve of both batteries at 25° C.

FIGS. 8A and AB show voltage and temperature curves during 1 C discharge from −20° C. ambient temperature of the dual resistance battery described above. It is seen that the cell internal temperature rises rapidly to 0° C. in the first 40 seconds of battery operation due to the high internal resistance and hence high rate of internal heat generation. Thereafter, the battery switches to the low-resistance level, and the cell voltage is seen to recover to around 3.7-3.8V and then gradually drops as 1 C discharge proceeds. The total discharge energy from −20° C. environment is calculated to be about 125.6 Wh in comparison to about 144.9 Wh at room temperature. Under the room temperature, both the conventional Li-ion battery and dual-resistance battery according to the present example achieve the same energy and power performance as the internal resistance of the dual-resistance battery stays at the same low level as in the conventional battery. However, the discharge energy of the dual resistance battery from −20° C. is 87% of that at room temperature. In contrast, the conventional battery produces 85.9 Wh at 1 C discharge in −20° C. climates which is only 59.3% of the conventional battery. A direct comparison of the 1 C discharge curves for a conventional battery and a dual-resistance battery in the −20° C. ambient is shown in FIG. 9 along with the reference performance curve at room temperature (25° C.). Clearly there is a significant advantage of dual-resistance battery in enhancing battery performance at low temperatures.

The impact of dual resistance battery technology on electric vehicles can be exemplified by considering a Tesla Model S vehicle. Such a vehicle has an estimated 285 mile cruising range at environmental temperature along the west coast. However, on the east coast where temperatures reach as low as the freezing point, such a vehicle has a cruising range of only 176 miles. If such a vehicle were equipped with a dual resistance battery having the performance shown in this example, the same vehicle would be capable of reaching approximately 248 miles in some of the coldest temperatures on the east coast.

Figure 10:
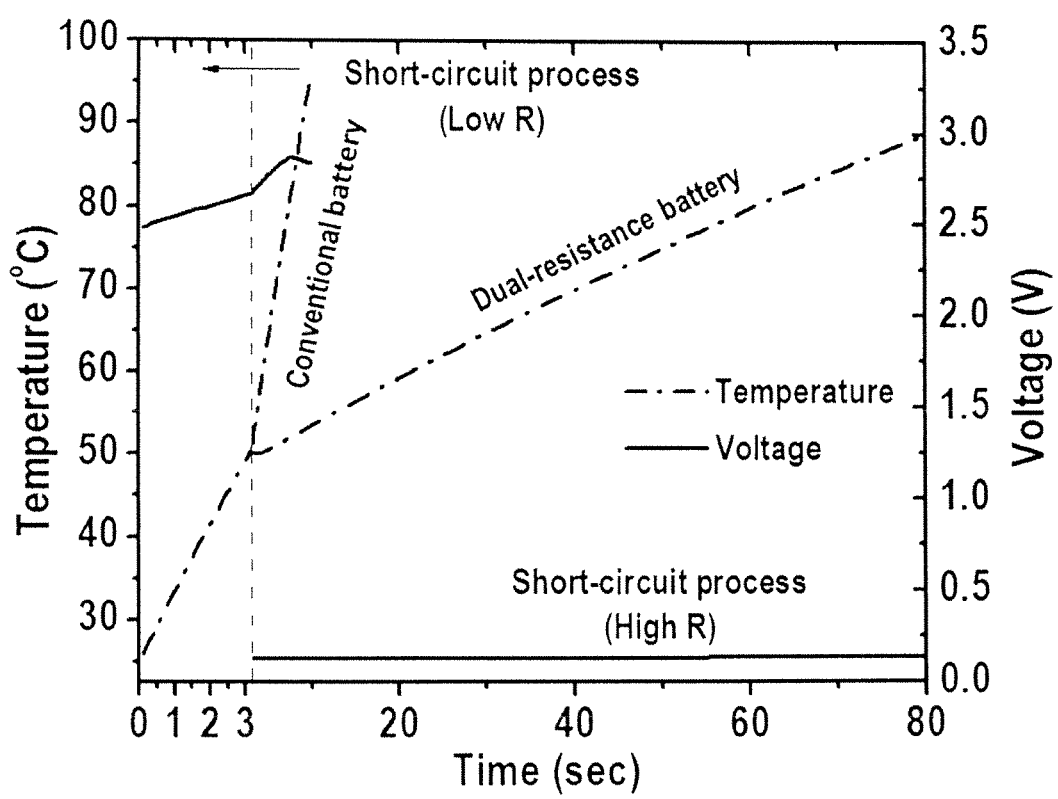
FIG. 10 is a graph that compares cell voltage and temperature evolutions of a conventional and a dual-resistance battery undergoing a short circuit event.

FIG. 10 shows the voltage and cell temperature responses of both the dual resistance battery and a conventional Li-ion battery when subject to an internal short circuit (ISC). For both batteries, the internal temperature rises to about 50° C. within the first 3 seconds of ISC. However, after that, the two batteries begin to respond vastly differently. The conventional battery continues to a violent temperature rise to over 90° C. within 10 sec, leading to thermal runaway. On the contrary, the dual resistance battery can be switched into the high internal-resistance level once the cell temperature exceeds 50° C., thus slowing down the battery energy release during ISC. Hence the temperature rise takes approximately 8 times longer in the dual resistance battery as compared to that in a conventional Li-ion battery. This extra time allows additional, valuable time for the dual resistance battery to avert a catastrophic thermal runaway, especially if a battery system has ability to activate effective cooling. The recent accident of Boeing Dreamliner 787 batteries demonstrates the vital importance of such a self-protection capability of Li-ion batteries.

In another specific example, if the dual resistance battery is subject to overcharge at a constant current, it will raise the internal temperature quickly to 50° C., followed by an abrupt jump in internal resistance and cell voltage. The higher internal resistance gives rise to much higher voltage during charge, e.g., about a 0.95V more voltage overshoot at 1 C charging when the battery's resistance switches from 1.25 mΩ to 25 mΩ as shown in FIGS. 7A-7C. Such a marked voltage overshoot can be easily detected by external electric circuits and hence overcharge can be terminated before the cell internal temperature reaches a sufficiently high value to initiate side reactions with electrolyte and other battery materials.

Aforementioned results show how the multi resistance rechargeable batteries of the present disclosure can provide robust and safe energy storage systems for electric vehicles and power grids. While the test results are shown for a Li-ion battery, multi resistance rechargeable batteries based on advanced Li-ion batteries, nickel-metal hydride (Ni-MH) and other battery chemistries is expected to have the same advantages.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A rechargeable battery comprising:
an anode electrode with multiple tabs along the anode electrode and a tab at an opposing end of the anode electrode; and
a cathode electrode with multiple tabs along the cathode electrode and a tab at an opposing end of the cathode electrode;
wherein the multiple tabs along the anode and cathode electrodes provide one level of internal resistance ($R_1$) for operating the battery over a temperature range of the battery between a first temperature ($T_1$) and a second temperature ($T_2$), and the tabs at the opposing ends of said anode and cathode electrodes provide a second level of internal resistance ($R_2$) for operating the battery outside of either $T_1$ or $T_2$, wherein the value of $R_2$ at about 2° C. below $T_1$ is at least twice the value of $R_1$ at $T_1$ or the value of $R_2$ at about 2° C. above $T_2$ is at least twice the value of $R_1$ at $T_2$.

2. The rechargeable battery according to claim 1, wherein the value of $R_2$ at about 2° C. below $T_1$ is at least twice the value of $R_1$ at $T_1$ and the value of $R_2$ at about 2° C. above $T_2$ is at least twice the value of $R_1$ at $T_2$.

3. The rechargeable battery according to claim 1, wherein $T_1$ is less than about 5° C. and $T_2$ is greater than about 45° C.

4. The rechargeable battery according to claim 1, wherein the value of $R_2$ at about 2° C. below $T_1$ is at least five times the value of $R_1$ at $T_1$ or the value of $R_2$ at about 2° C. above $T_2$ is at least five times the value of $R_1$ at $T_2$.

5. The rechargeable battery according to claim 1, wherein the battery comprises at least two terminals welded to the multiple tabs along the anode and cathode electrodes for operating the battery at $R_1$ and at least two terminals welded to the tabs at the opposing ends of the anode and cathode electrodes for operating the battery at $R_2$.

6. The rechargeable battery according to claim 5, wherein the battery further comprises a switch configured to switch between $R_1$ and $R_2$.

7. The rechargeable battery according to claim 5, wherein the battery further comprises a switch driven by a temperature sensor for switching between the terminals for operating the battery at $R_1$ and the terminals for operating the battery at $R_2$.

8. The rechargeable battery according o claim 7, wherein the switch is a thermostat or a bimetal switch.

9. The rechargeable battery according to claim 8, wherein the temperature sensor is a thermocouple or a thermistor mounted inside the battery or on an outer surface of a cell of the battery.

10. The rechargeable battery according to claim 1, wherein the battery is a lithium-ion battery.

11. The rechargeable battery according to claim 10, wherein the positive-electrode active material includes lithium cobalt oxide, lithium iron phosphate, lithium manganese oxide, lithium nickel-cobalt-manganese oxides, lithium-rich layered oxides, or their mixtures.

12. The rechargeable battery according to claim 10, wherein the negative-electrode active material includes graphite, silicon, silicon alloy, lithium metal or a metal alloy.

13. The rechargeable battery according to claim 10, wherein the battery comprises an electrolyte in the form of a liquid, polymer-gel, or solid.

14. The rechargeable battery according to claim 1, wherein the battery is a nickel-metal hydride battery.

15. The rechargeable battery according to claim 1, wherein the battery has a pouch, a cylindrical, a prismatic or an angular form.

16. A battery system comprising the rechargeable battery according to claim 1 and a controller that can switch between operating the battery at $R_1$ and operating the battery at $R_2$.

17. The battery system according to claim 16, further comprising a temperature sensor for determining the temperature of $T_1$ and $T_2$.

* * * * *